United States Patent
Santori, Jr. et al.

(10) Patent No.: US 9,305,288 B2
(45) Date of Patent: Apr. 5, 2016

(54) SYSTEM AND METHOD FOR PROVISIONING ELECTRONIC MAIL IN A VEHICLE

(75) Inventors: Nello Joseph Santori, Jr., Canton, MI (US); Brian Woogeun Joh, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1004 days.

(21) Appl. No.: 12/346,394

(22) Filed: Dec. 30, 2008

(65) Prior Publication Data

US 2010/0169432 A1 Jul. 1, 2010

(51) Int. Cl.
*G06F 15/16* (2006.01)
*G06Q 10/10* (2012.01)
*H04L 12/58* (2006.01)
*G10L 25/00* (2013.01)

(52) U.S. Cl.
CPC .......... *G06Q 10/107* (2013.01); *H04L 12/5835* (2013.01); *H04L 51/066* (2013.01); *H04L 51/22* (2013.01); *H04L 12/5895* (2013.01)

(58) Field of Classification Search
CPC .................. G06Q 10/107; H04L 51/22–51/26; H04L 12/58–12/5895
USPC ......................................................... 709/206
See application file for complete search history.

(56) References Cited

U.S. PATENT DOCUMENTS

| | | | |
|---|---|---|---|
| 5,627,766 A | 5/1997 | Beaven | |
| 5,664,177 A | 9/1997 | Lowry | |
| 5,717,742 A * | 2/1998 | Hyde-Thomson | 379/88.17 |
| 6,092,101 A * | 7/2000 | Birrell et al. | 709/206 |

(Continued)

FOREIGN PATENT DOCUMENTS

| | | | | |
|---|---|---|---|---|
| EP | 1791058 A1 | 5/2007 | | |
| JP | 2005038101 A | * | 2/2005 | ............... G06F 3/00 |
| WO | WO2004114055 A2 | 12/2004 | | |

OTHER PUBLICATIONS

Muthusamy, Y.; Agarwal, R.; Yifan Gong; Viswanathan, V.; , "Speech-enabled information retrieval in the automobile environment," Acoustics, Speech, and Signal Processing, 1999. ICASSP '99. Proceedings., 1999 IEEE International Conference on , vol. 4, no., pp. 2259-2262 vol. 4, Mar. 15-19, 1999.*

(Continued)

*Primary Examiner* — Emmanuel L Moise
*Assistant Examiner* — Julian Chang
(74) *Attorney, Agent, or Firm* — Jennifer Stec; Brooks Kushman P.C.

(57) ABSTRACT

Systems and methods are disclosed for wirelessly communicating electronic mail messages at a vehicle. A computer processor is in communication with a memory device having software for an e-mail service, and electronic mail account credentials enabling access to one or more electronic mail accounts. A transceiver is in communication with the computer processor, and is capable of pairing with one or more wireless communication devices (e.g. cellular phone, etc.) for wirelessly communicating data between the processor and electronic mail servers located remotely from the vehicle. The processor operates the transceiver to wirelessly access the one or more electronic mail accounts at the electronic mail server(s) to wirelessly send or receive electronic mail messages at the vehicle. The computer processor convert received electronic mail messages to speech signals for playback.

8 Claims, 7 Drawing Sheets

(56) References Cited

U.S. PATENT DOCUMENTS

| | | | |
|---|---|---|---|
| 6,157,616 A | 12/2000 | Whitehead | |
| 6,161,071 A | 12/2000 | Shuman et al. | |
| 6,212,265 B1* | 4/2001 | Duphorne | 379/142.15 |
| 6,330,436 B1 | 12/2001 | Zidel | |
| 6,427,115 B1* | 7/2002 | Sekiyama | 701/208 |
| 6,442,592 B1 | 8/2002 | Alumbaugh et al. | |
| 6,493,871 B1 | 12/2002 | McGuire et al. | |
| 6,622,124 B1 | 9/2003 | Kolls | |
| 6,625,257 B1 | 9/2003 | Asaoka et al. | |
| 6,658,485 B1 | 12/2003 | Baber et al. | |
| 6,728,531 B1 | 4/2004 | Lee et al. | |
| 6,799,201 B1 | 9/2004 | Lee et al. | |
| 6,856,820 B1 | 2/2005 | Kolls | |
| 6,925,466 B2 | 8/2005 | Jensen et al. | |
| 7,003,289 B1 | 2/2006 | Kolls | |
| 7,027,773 B1 | 4/2006 | McMillin | |
| 7,035,634 B2 | 4/2006 | Mead et al. | |
| 7,069,333 B1 | 6/2006 | Morris et al. | |
| 7,130,620 B2 | 10/2006 | Forman et al. | |
| 7,177,634 B2 | 2/2007 | Wang et al. | |
| 7,213,150 B1 | 5/2007 | Jain et al | |
| 7,240,089 B2 | 7/2007 | Boudreau | |
| 7,260,631 B1 | 8/2007 | Johnson et al. | |
| 7,280,900 B2 | 10/2007 | Gault et al. | |
| 7,296,207 B2 | 11/2007 | Fisher et al. | |
| 7,339,913 B2 | 3/2008 | Chou et al. | |
| 7,366,772 B2 | 4/2008 | Arroyo et al. | |
| 7,593,792 B2* | 9/2009 | Berg et al. | 701/1 |
| 7,624,147 B2* | 11/2009 | Tosey et al. | 709/206 |
| 7,689,253 B2* | 3/2010 | Basir | 455/563 |
| 7,801,512 B1 | 9/2010 | Myr | |
| 7,944,901 B2 | 5/2011 | Souissi et al. | |
| 2001/0034630 A1 | 10/2001 | Mayer et al. | |
| 2002/0106991 A1 | 8/2002 | Foore et al. | |
| 2002/0110146 A1 | 8/2002 | Thayer et al. | |
| 2002/0188673 A1 | 12/2002 | Gimson | |
| 2002/0199061 A1* | 12/2002 | Friedman et al. | 711/118 |
| 2003/0014490 A1* | 1/2003 | Bates et al. | 709/206 |
| 2003/0017826 A1* | 1/2003 | Fishman et al. | 455/426 |
| 2003/0023688 A1* | 1/2003 | Denenberg et al. | 709/206 |
| 2003/0061288 A1* | 3/2003 | Brown et al. | 709/206 |
| 2004/0092253 A1 | 5/2004 | Simonds et al. | |
| 2004/0190693 A1 | 9/2004 | Beiermeister | |
| 2004/0198366 A1 | 10/2004 | Crocker et al. | |
| 2004/0203634 A1 | 10/2004 | Wang et al. | |
| 2004/0203645 A1 | 10/2004 | Forman et al. | |
| 2004/0218605 A1 | 11/2004 | Gustafsson et al. | |
| 2005/0017604 A1 | 1/2005 | Yamada | |
| 2005/0033863 A1* | 2/2005 | Tosey | 709/248 |
| 2005/0038581 A1 | 2/2005 | Kapolka et al. | |
| 2005/0038863 A1 | 2/2005 | Onyon et al. | 709/207 |
| 2005/0076086 A1* | 4/2005 | Budd et al. | 709/206 |
| 2005/0195783 A1 | 9/2005 | Basir | |
| 2006/0015221 A1 | 1/2006 | Sarkar et al. | |
| 2006/0023674 A1 | 2/2006 | Goring et al. | |
| 2006/0212577 A1 | 9/2006 | Kohnke | |
| 2006/0233187 A1 | 10/2006 | Karmakar et al. | |
| 2007/0005368 A1* | 1/2007 | Chutorash et al. | 704/275 |
| 2007/0042812 A1* | 2/2007 | Basir | 455/569.2 |
| 2007/0086482 A1 | 4/2007 | Pruzan et al. | |
| 2007/0127363 A1 | 6/2007 | Chaudry et al. | |
| 2007/0237144 A1 | 10/2007 | Adhikari et al. | |
| 2007/0244614 A1 | 10/2007 | Nathanson | |
| 2007/0260751 A1* | 11/2007 | Meesseman | 709/248 |
| 2007/0291911 A1* | 12/2007 | Visser | 379/88.13 |
| 2008/0015748 A1 | 1/2008 | Nagy | |
| 2008/0027643 A1* | 1/2008 | Basir et al. | 701/213 |
| 2008/0045274 A1* | 2/2008 | Witkowski et al. | 455/569.2 |
| 2008/0102854 A1 | 5/2008 | Yi et al. | |
| 2008/0140408 A1* | 6/2008 | Basir | 704/260 |
| 2008/0215687 A1* | 9/2008 | Madnani | 709/206 |
| 2008/0256203 A1 | 10/2008 | Gorty et al. | |
| 2008/0263168 A1* | 10/2008 | Ishii | 709/206 |
| 2008/0303667 A1 | 12/2008 | Rehman | |
| 2008/0305742 A1* | 12/2008 | Basir | 455/41.2 |
| 2008/0313050 A1* | 12/2008 | Basir | 705/26 |
| 2009/0023425 A1 | 1/2009 | Hosain et al. | |
| 2009/0024707 A1* | 1/2009 | Aase et al. | 709/206 |
| 2009/0088189 A1 | 4/2009 | Hardy et al. | |
| 2009/0093242 A1* | 4/2009 | Bhalekar et al. | 455/418 |
| 2009/0164110 A1* | 6/2009 | Basir | 701/117 |
| 2009/0240763 A1* | 9/2009 | Hones et al. | 709/203 |
| 2010/0023204 A1* | 1/2010 | Basir et al. | 701/33 |
| 2010/0077410 A1 | 3/2010 | Graser et al. | |
| 2010/0137037 A1* | 6/2010 | Basir | 455/569.1 |
| 2010/0190493 A1 | 7/2010 | Zoecklet et al. | |
| 2010/0227593 A1 | 9/2010 | Myr | |

OTHER PUBLICATIONS

Marx, M. "Toward Effective Conversational Messaging". 1995, MIT.*
Balito, "AccessAble: A Text-to-Speech Mail Client Application", 2008, UPLB ICS.*
Kermit Whitfield, "A hitchhiker's guide to the telematics ecosystem", Automotive Design & Production, Oct. 2003, http://findarticles.com, pp. 1-3.
Ford Motor Company, "SYNC with Navigation System," Owner's Guide Supplement, SYNC System Version 1 (Jul. 2007).
Ford Motor Company, "SYNC," Owner's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
RFC 791—Internet Protocol, Darpa Internet Program, Protocol Specification, Sep. 1981, prepared for Defense Advanced Research Projects Agency, 1400 Wilson Boulevard, Arlington, VA 22209, by Information Sciences Institute, pp. 1-98.
RFC 1662—PPP in HDLC-like Framing, Network Working Group, STD: 51, Obsoletes: 1549, Category: Standards Track, W. Simpson, Editor, Daydreamer, Jul. 1994, pp. 1-29.
RFC 3344, IP Mobility Support for IPv4, Network Working Group, C. Perkins, Ed., Nokia Research Center, Aug. 2002, Obsoletes: 3220, Category: Standards Track, pp. 1-98.
B. Curtis, et al., An e-mail user interface to Web services, printed from www.ibm.com/developerworks/wireless/library/wi-email/, printed Jan. 28, 2009.
SAM—Simple Asynchronous Messaging, printed from project-sam.awardspace.com/overview.htm, on Sep. 11, 2009.
Focus on the road ahead, IBM Telematics Solutions, Copyright, IBM Corporation 2002.
Queuing Data with Microsoft Message Queue Server, printed from windowsitpro.com/article/articleid/3860, printed Aug. 4, 2009.

* cited by examiner

SYSTEM AND METHOD FOR PROVISIONING ELECTRONIC MAIL IN A VEHICLE

BACKGROUND

1. Technical Field

The illustrative embodiments generally relate to a system and method for provisioning a wireless connection between a wireless device and a vehicle-based computing system.

2. Background Art

Several methods and systems have been disclosed which involve wireless communication of electronic mail messages to and from automobiles. These systems include the following.

U.S. Pat. No. 6,625,257 issued to Asaoka, et al. discloses a message processing device for a vehicle that is adapted to obtain text data and read aloud the text data aloud by using a voice synthesizer. A loudspeaker device is connected to the message processing device to output or read aloud the text data. The text data can be received through a receiving device that receives outside information data or e-mail message data.

U.S. Pat. No. 7,035,634 issued to Mead et al. discloses systems and methods for sending and receiving e-mail from a terminal on a vehicle. According to one embodiment, a passenger in a vehicle has access to a terminal and can send and receive e-mail messages between the terminal and a first server located on the vehicle. The first server wirelessly communicates e-mail messages with a second server external to the vehicle. The second server is configured to send and receive e-mail messages between the second server and a data network.

U.S. Pat. No. 7,003,289 and U.S. Pat. No. 6,856,820 issued to Kolls disclose a communication interface device for managing wireless data transmission between a vehicle and the internet. An in-vehicle device communicates with Internet based data processing resources for the purpose of transacting e-mail, e-commerce, and e-business. The in-vehicle device and the Internet based data processing resources can effectuate a wide variety of e-mail, e-commerce, and e-business including accessing auto part databases, warranty, customer, and other remote databases. In addition, e-mail, e-commerce, and e-business transactions can include vehicle security and vehicle service management, data communicating Internet based radio, audio, MP3, MPEG, video, and other types of data. The in-vehicle device can also wirelessly data communicate with a communication interface device (COM device) or an Internet appliance. Such COM devices or Internet appliances can data communicate wirelessly with an in-vehicle device and simultaneously data communicate in a wired or wireless mode of operation to Internet based data processing resources, and to other data processing resources.

U.S. Pat. Nos. 6,799,201 and 6,728,531 issued to Lee et al. disclose a remotely configurable multimedia entertainment and information system for vehicles. An internet radio in a vehicle allows access to audio, visual and other information. Normal radio channel function is provided along with programmable content and channel selection, as well as automatic content and channel updating by location and style. Internet access is also provided through wireless communications. Customized information is also communicated to the radio such as stock quotes, travel information, advertising, and e-mail.

U.S. Pat. No. 6,622,124 issued to Kolls discloses a method of transacting electronic mail, electronic commerce, and electronic business by an electronic commerce terminal operated on a transportation vehicle. An advertising and payment system and method are disclosed for networking, monitoring and effectuating e-mail, e-commerce, and e-business and controlling vending equipment and applications. Remote connection to the network includes Internet type connections, telecommunication (telephone, ISDN, ADSL), VSAT satellite, and other wire and wireless transmission.

SUMMARY

A non-limiting embodiment includes a system for wirelessly communicating electronic mail messages at a vehicle. The system includes a computer processor in a vehicle. The computer processor is in communication with a memory device having software stored thereon for the provision of an e-mail service within the vehicle, and electronic mail account credentials for enabling access to one or more electronic mail accounts. A transceiver within the vehicle is in communication with the computer processor, and is capable of pairing the computer processor with one or more wireless communication devices for wirelessly communicating data between the computer processor and one or more electronic mail servers located remotely from the vehicle. The computer processor is configured to operate the transceiver and wirelessly access the one or more electronic mail accounts at the one or more electronic mail servers to wirelessly send or receive electronic mail messages at the vehicle. The computer processor is also configured to convert at least a portion of one or more received electronic mail messages to speech signals for playback at the vehicle.

The computer processor may be configured to retrieve current listing of electronic mail message identifiers from the remote electronic mail server for a current electronic mail message download session, compare the current listing to a previous listing of electronic mail message identifiers retrieved from the remote electronic mail server in a previous electronic mail message download session to determine which electronic mail messages are new with respect to the previous electronic mail message download session, and download one or more of the new messages.

The computer processor may be configured to download a rolling window of electronic mail messages for playback at the vehicle wherein the rolling window comprises one or more electronic mail messages received before a selected electronic mail messages, and one or more electronic mail messages received after a selected electronic mail message. The selected electronic mail message may be an electronic mail message selected for playback.

The system may comprise one or more speakers within the vehicle. The computer processor may be configured to output at least a portion of one or more received electronic mail messages through the one or more speakers.

The computer processor may be configured to output a specified portion of one or more electronic mail messages. The specified portion is one or more items selected from the group consisting of sender, recipient(s), date and subject.

The system may comprise a microphone and the computer processor may be configured to record an outgoing message. The computer processor may record the outgoing message to an audio file and attach the audio file to an outgoing electronic mail message. The computer processor may also be configured to convert the recorded outgoing message to text and embed the text into an outgoing electronic mail message.

The recipient(s) of outgoing electronic mail messages may be selected from an address listing stored in a memory on the wireless communication device paired with the transceiver.

The electronic mail account credentials may include a PIN number, and the computer processor may prompt a vehicle occupant for entry of the PIN before access to the electronic mail account is permitted.

A non-limiting embodiment includes a method for wirelessly communicating electronic mail messages at a vehicle. The method may include pairing a computer processor in a vehicle with a local cellular telephone for wireless data communication between the computer processor and the cellular telephone, and accessing electronic mail account access credentials from a memory device in communication with the computer processor. The method may also include operating the cellular telephone to connect wirelessly to a remote telecommunications network having connectivity to the Internet, and utilizing the electronic mail account credentials to obtain access over the telecommunications network to the electronic mail account at an electronic mail server. The method may involve communicating one or more electronic mail messages between the computer processor and the remote electronic mail server through the cellular telephone, and converting at least a portion of a received electronic mail message to speech signals for playback at the vehicle.

The method may also include retrieving a current listing of electronic mail message identifiers from the remote electronic mail server for a current electronic mail message download session, comparing the current listing to a previous listing of electronic mail message identifiers retrieved from the remote electronic mail server in a previous electronic mail message download session to determine which electronic mail messages are new with respect to the previous electronic mail message download session, and downloading one or more of the new messages.

The method may also include downloading a rolling window of electronic mail messages for playback at the vehicle wherein the rolling window comprises one or more electronic mail messages received before a selected electronic mail messages, and one or more electronic mail messages received after a selected electronic mail message.

The method may also include playing back at the vehicle only a specified portion of one or more electronic mail messages. The specified portion may be one or more items selected from the group consisting of sender, recipient(s), date and subject.

The method may also include recording speech signals representing an outgoing message, and attaching the recording as an audio file to an outgoing electronic mail message. The recording may be converted to text and embedded into the outgoing electronic mail message.

The method may also include selecting one or more recipient for the outgoing message from an address listing stored in a memory on the wireless communication device paired with the computer processor.

The method may also include prompting a vehicle occupant for entry of a PIN number associated with the electronic mail account before permitting access to the electronic mail account.

Other aspects and characteristics of the illustrative embodiments will become apparent from the following detailed description of exemplary embodiments, when read in view of the accompanying drawings.

DETAILED DESCRIPTION OF THE EMBODIMENT(S)

The present invention is described herein in the context of particular exemplary illustrative embodiments. However, it will be recognized by those of ordinary skill that modification, extensions and changes to the disclosed exemplary illustrative embodiments may be made without departing from the true scope and spirit of the instant invention. In short, the following descriptions are provided by way of example only, and the present invention is not limited to the particular illustrative embodiments disclosed herein.

The Vehicle Computing and Communication Systems

Figure 1:
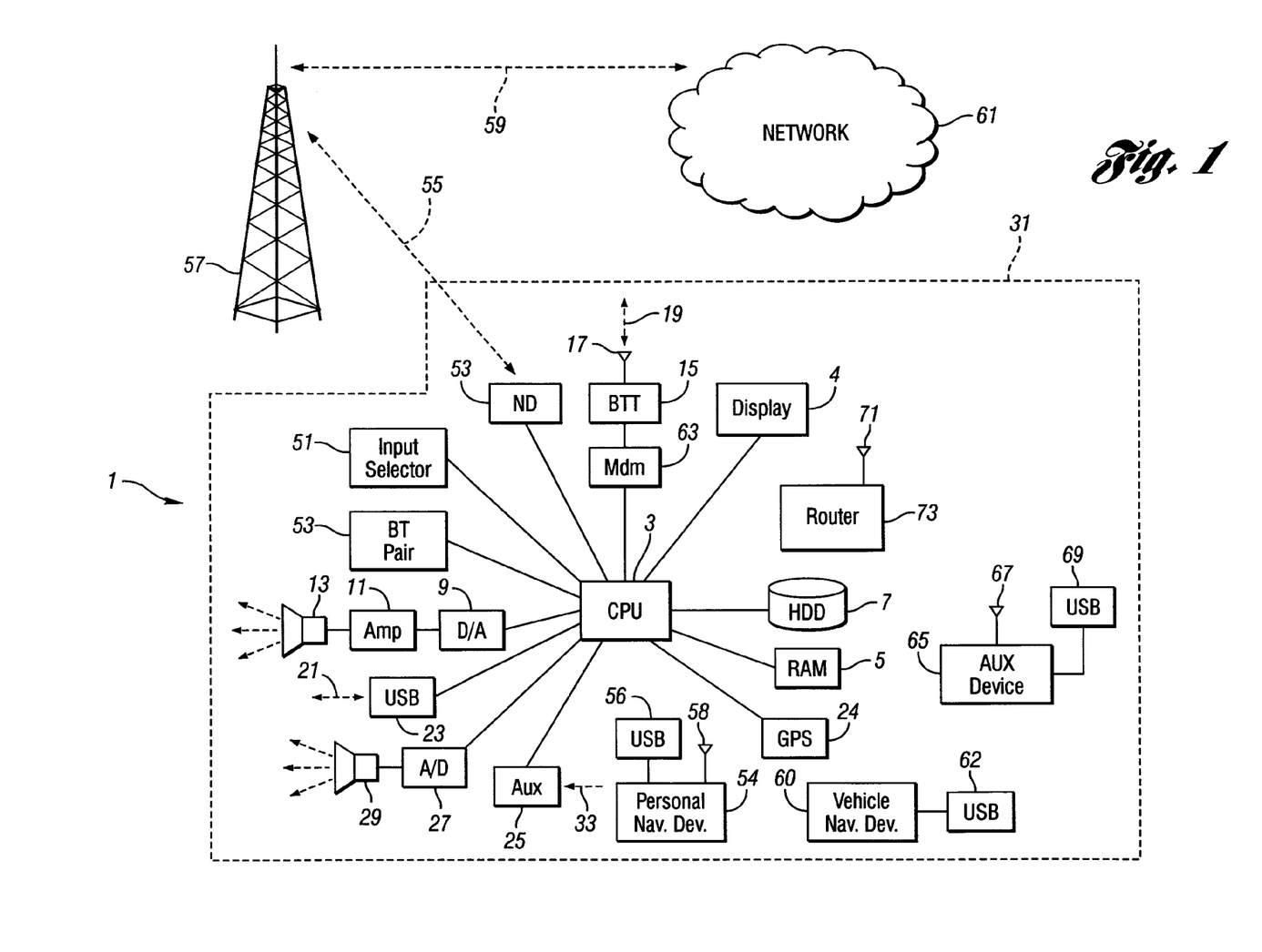
FIG. 1 shows an illustrative example of a vehicle communication and entertainment system capable of network connection.

FIG. 1 illustrates system architecture of an illustrative onboard computing and communication system in accordance with an embodiment of the present invention. A vehicle enabled with a vehicle-based computing system may contain a visual display 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. Electrical connections illustrated in FIG. 1 may be direct connections between devices. Alternatively, or additionally, devices may communicate over one or more data busses or networks within the vehicle, such as a Controller Area Network (CAN) or other form of multiplex communication. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BlueTooth device such as PND 54 or a USB device such as vehicle navigation device 60 along the bi-directional data streams shown at 19 and 21 respectively.

In one illustrative embodiment, the system 1 uses the BlueTooth transceiver 15 to communicate 17 with a user's nomadic device 53 (e.g., without limitation, cell phone, smart phone, PDA, etc.). The nomadic device can then be used to communicate 59 with a network 61 outside the vehicle 31 through, for example, communication 55 with a cellular tower 57.

Pairing a nomadic device 53 and the BlueTooth transceiver 15 can be instructed through a button 53 or similar input, telling the CPU that the onboard BlueTooth transceiver will be paired with a BlueTooth transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 in order to transfer data between CPU 3 and network 61 over the voice band. In one illustrative embodiment, the processor is provided with an operating system including an API to communicate with modem application software. The modem application software may access an embedded module or firmware on the BlueTooth transceiver to complete wireless communication with a remote BlueTooth transceiver (such as that found in a nomadic device). In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is affixed to vehicle 31.

In one embodiment, incoming data can be passed through the nomadic device via a data-over-voice or data-plan, through the onboard BlueTooth transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73.

Network Access

Figure 2:
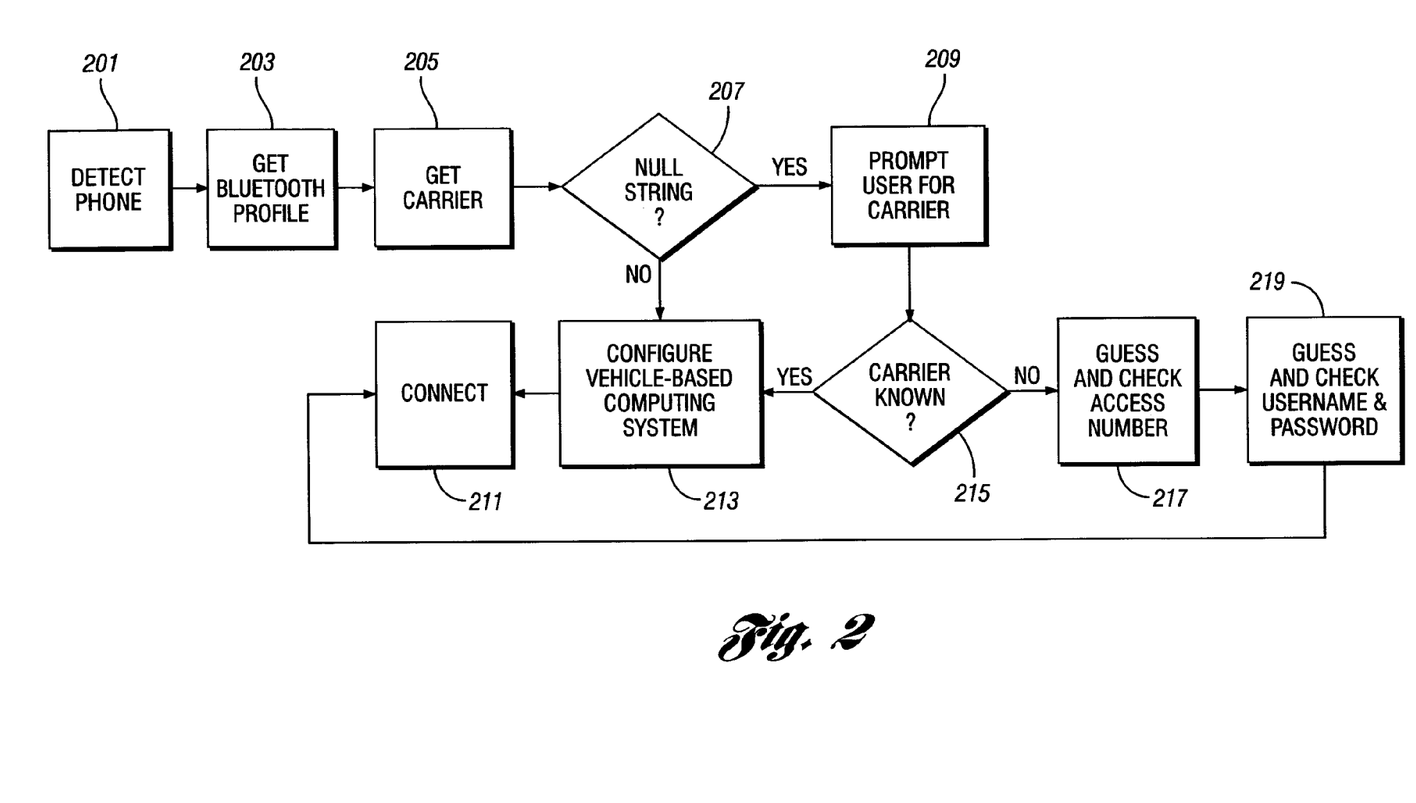
FIG. 2 shows an illustrative exemplary flow for communication connection between a vehicle-based computing system and a wireless device.

FIG. 2 shows an illustrative exemplary process for communication between a vehicle-based computing system and a wireless device. Initially, a vehicle-based computing system is provided with at least a transceiver, capable of receiving a signal from a wireless device.

The transceiver detects the presence of a wireless device 201, such as a BlueTooth enabled cellular phone. In this illustrative embodiment, a pairing has already been made between the wireless device and the vehicle-based computing system allowing communication between the two. If, however, such a pairing is not made, and is needed, it can be done in a conventional fashion.

Once the signal is detected and communication is possible between the vehicle-based computing system and the wireless device, the system retrieves a BlueTooth profile of the wireless device 203. This may be done by, for example auditing the device.

In response to an audit request, the device may send a variety of information back to the vehicle-based computing system. This information can include, but is not limited to, a hands free profile (HFP), a dial-up networking (DUN) profile, a personal area network (PAN) profile, a serial port profile, a fax profile and a file transfer profile (FTP) profile, an advanced audio distribution profile (A2DP), an audio/video remote control profile (AVRCP), a basic imaging profile (BIP), a basic printing profile (BPP), a common ISDN access profile (CIP), a cordless telephony profile (CTP), a device ID profile (DID), a general audio/video distribution profile (GAVDP), a general access profile (GAP), a generic object exchange profile (GOEP), a hard copy cable replacement profile (HCRP), a human interface device profile (HID), a headset profile (HSP), an intercom profile (ICP), a LAN access profile (LAP), an object push profile (OPP), a phone book access profile (PBAP), a service discovery application profile (SDAP), a SIM access profile (SAP, SIM), a synchronization profile (SYNCH), a video distribution profile (VDP), and a wireless application protocol bearer (WAPB).

The HFP may be used to allow a hands-free kit (such as may be installed in an automobile) to communicate with a BlueTooth device. In addition, the HFP can provide useful information about a BlueTooth device. For example, the HFP may provide a "carrier string," which can provide the vehicle-based computing system with the name of the carrier 205. The use of the carrier information will be described later in detail.

Alternatively, the carrier string may be a NULL string 207. If the string is NULL, that means that the vehicle based system may not be able to detect the carrier from the carrier string provided by the HFP. In this instance, the vehicle based system may prompt the user to provide the carrier 209.

In one illustrative embodiment, such prompting is done through vehicle speakers in an audible fashion. Alternatively, a message could be displayed on a vehicle display device, such as a navigation display or other display. Any other suitable method of prompting the user is also possible.

In response to the prompt, the user will need to provide the name of the carrier, if known. If the vehicle-based system is equipped with a microphone and a form of voice-recognition technology, this input can be done using the microphone. Alternatively, it could be entered into an interactive vehicle display, entered on a remote device and downloaded to the vehicle, or provided in any other suitable manner.

If the carrier is known to the user 215, or if the carrier is obtainable from a carrier string, the vehicle-based communication system may proceed to configure a device connection between the system and the wireless device 213. A non-limiting illustrative example of this process is provided with respect to FIG. 3.

If the carrier is unknown to the user 215, the vehicle-based system may engage in a guess-and-check process to determine the carrier 217 and/or the user name and password combination 219. Non-limiting illustrative examples of these guess-and-check procedures are provided with respect to FIGS. 4 and 5.

After a connection between the device and the vehicle-based computing system is established, the system can then use the device to connect to the internet 211.

Figure 3:
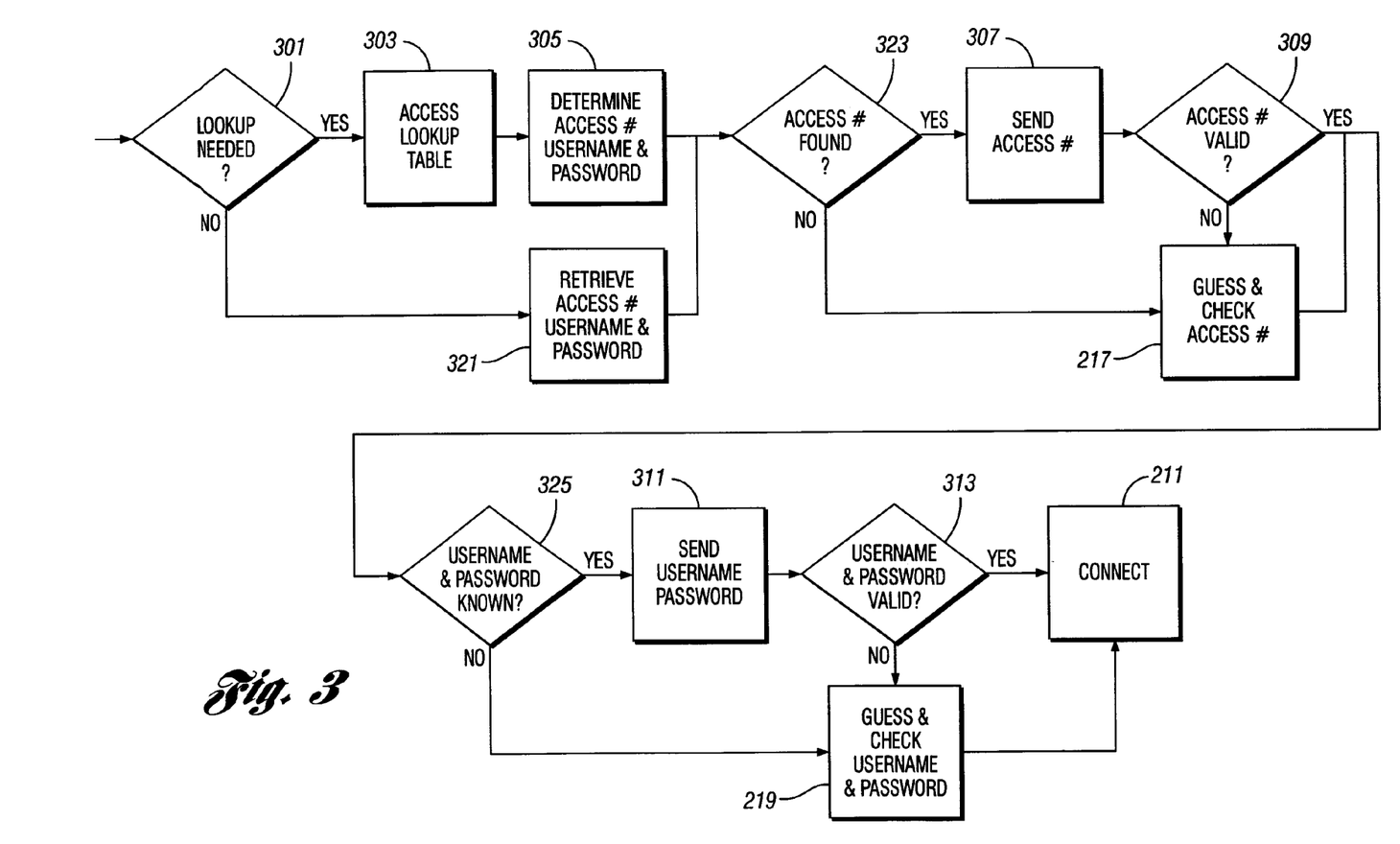
FIG. 3 shows an illustrative exemplary flow for communication provisioning.

FIG. 3 shows an illustrative exemplary flow for communication provisioning 213. In this illustrative implementation, the vehicle-based communication system first determines if a lookup is needed 301.

Presently, different carriers (or providers) use different access numbers and different user name/password configurations. While this may be standardized at some point, presently, if a user wishes to connect to, for example, an AT&T phone as opposed to a VERIZON phone, a different number, user name and password will be needed.

Although the carriers use different numbers and user name/password combinations, these numbers and combinations are also generally standardized within a carrier. For example, if connecting to an AT&T or CINGULAR device, the username would be either wap@cingulargprs.com (for a wireless access point "WAP" connection) or isp@cingulargprs.com (for an internet service protocol "ISP" connection). The password in either case is "cingular1." Further, it is the case that the phone either has no access number (also known as a access point name, or "APN"), or has an APN specific to all AT&T CINGULAR phones. Many major providers are similarly standardized internally.

It may be the case that there is already an APN and/or username and password associated with the wireless device. This could have been from a previous usage of the device, from user input, or for a variety of other reasons. For example, the vehicle-based computing system may have previously looked-up and stored the connection information for a particular device in a profile associated with the device and kept in persistent memory. If such information is available without using a look-up table, the information is retrieved 321 for use.

On the other hand, a look-up may be necessary. In this illustrative embodiment, the vehicle-based communication system is provided with a look-up table containing, for example, common carriers and the APNs and user name/password combinations for those common carriers.

Also, in this illustrative embodiment, the system has established a carrier name (through, for example, a carrier string) and can use the carrier name to cross reference the look-up table to find the appropriate information 303. Once the carrier name is found on the look-up table, the APN and/or user name/password combination may be determined 305.

After either attempting to retrieve the APN and user name/password combination or attempting to look the information up, the system checks to see if an APN was found 323. It may be the case that the carrier information was not available in the look-up table, or that the stored information was corrupted or otherwise unavailable.

If an APN was found, the system sends the APN to the wireless device 307 in an attempt to initiate a connection. If the APN is valid 309, the system can proceed to entering a user name/password. If the APN is invalid 309 for some reason, or if the APN was never found, the system can still attempt to use a guess-and-check method 217 to determine an appropriate APN (described in detail with respect to FIG. 4).

Once a valid APN has been sent to the wireless device, the system checks to see if a user name and password are known 325. It may be the case that only the APN is available from the look-up table, or, again, stored information may be corrupted or unavailable.

If the user name and password have been determined or retrieved (or otherwise obtained), the system sends the user name and password to the device to login to the device 311.

If the device rejects the user name and/or password, or if the user name or password are not known, the system may attempt to use a guess-and-check method to determine the user name and/or password 219.

If the user name and password are accepted by the device, the system stores the APN, user name and password for later use 327. This may help provide faster access in the future, as the steps of obtaining this information may be expedited by the stored information.

The system may then attempt to connect to the internet (or other network) through the connection with the wireless device 211.

Figure 4:
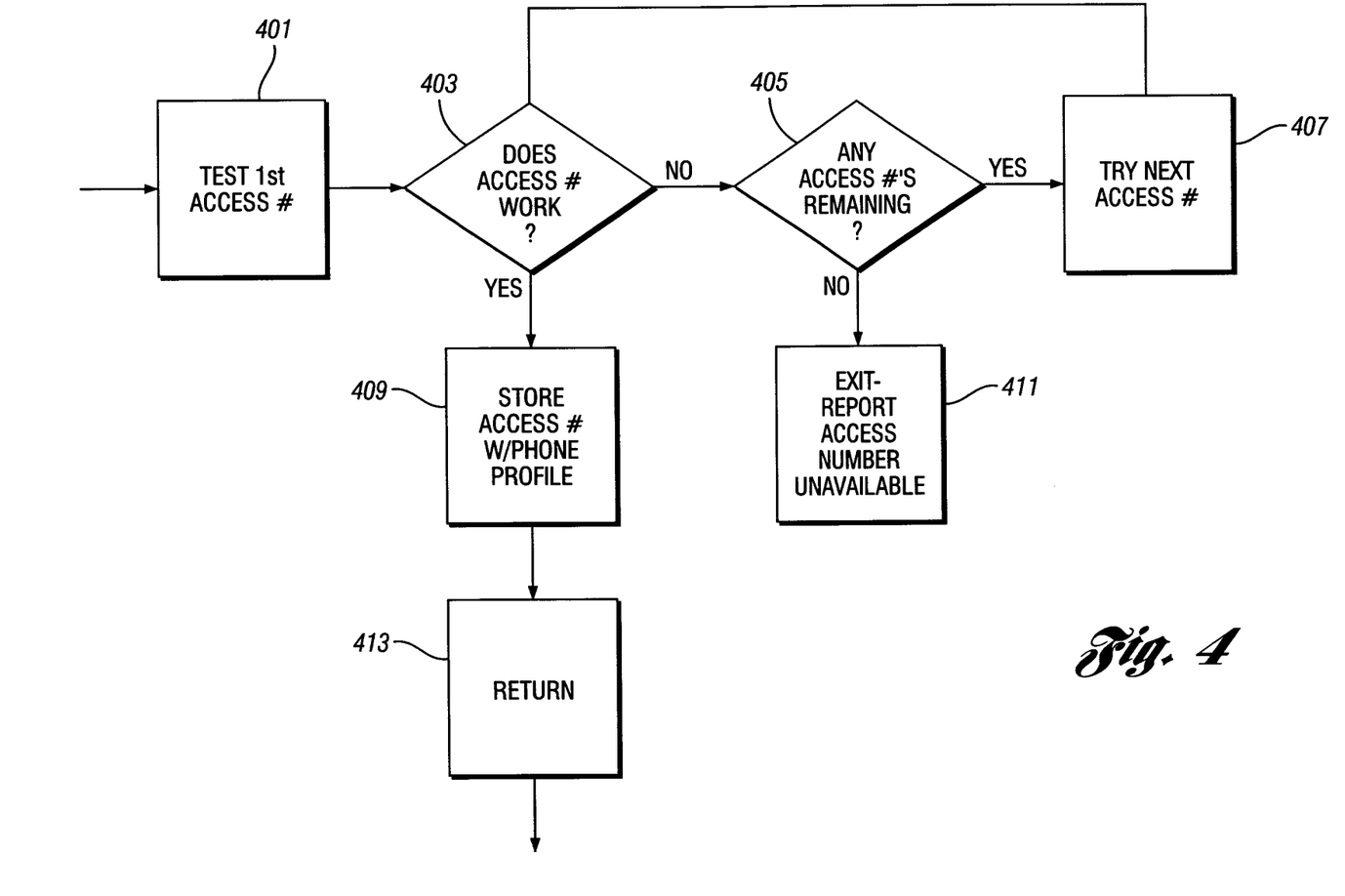
FIG. 4 shows an illustrative exemplary flow for determining a network access number.

FIG. 4 shows an illustrative exemplary flow for determining an access number. The exemplary processes previously described herein illustrate several situations, 309 and 215 wherein it might be desirable to have a system guess-and-check for an APN. These are, of course, illustrative and not meant to limit the scope of the invention in any manner.

If the system is unable to automatically determine an APN for some reason, it may resort to a guess-and-check method for attempting to determine the APN. For example, it may be the case that all carriers use one of N numbers for an APN. Or, although a carrier name may be unavailable or unknown, the carrier may still provide service for a particular wireless device. In this instance, the APN usable were the carrier name known should be the same APN to provide service to the unknown-carrier wireless device. Accordingly, in situations such as this, a guess-and-check methodology may successfully provide an APN and allow a connection to be established.

In this illustrative embodiment, the system has a list of common and/or possible APNs provided thereto. In some order, the system will test these APNs and determine which, if any, are usable with a given wireless device.

Starting at some point on the list, the system tests a first APN against the wireless device 401. If access is established, 403, the system can store the APN with a wireless device profile (assuming such storage is available) 409. The system can then return to a process that called the guess-and-check process 413.

If the APN does not work 403, the system checks to see if any APNs are remaining 405. If no APNs remain, the system exits and reports that an APN is unavailable 411. Alternatively, for example, the system could query a user to see if the APN is known, connect to the internet (through, for example, a voice over IP connection) and see if APNs are available that have not been tested, instruct the user to enter an appropriate APN at a later time online and send it to the system for an update, etc.

If any APNs remain on the list, the system tries the next APN (or a different APN) 407, and repeats the attempts until finding an APN that works or running out of APNs.

Figure 5:
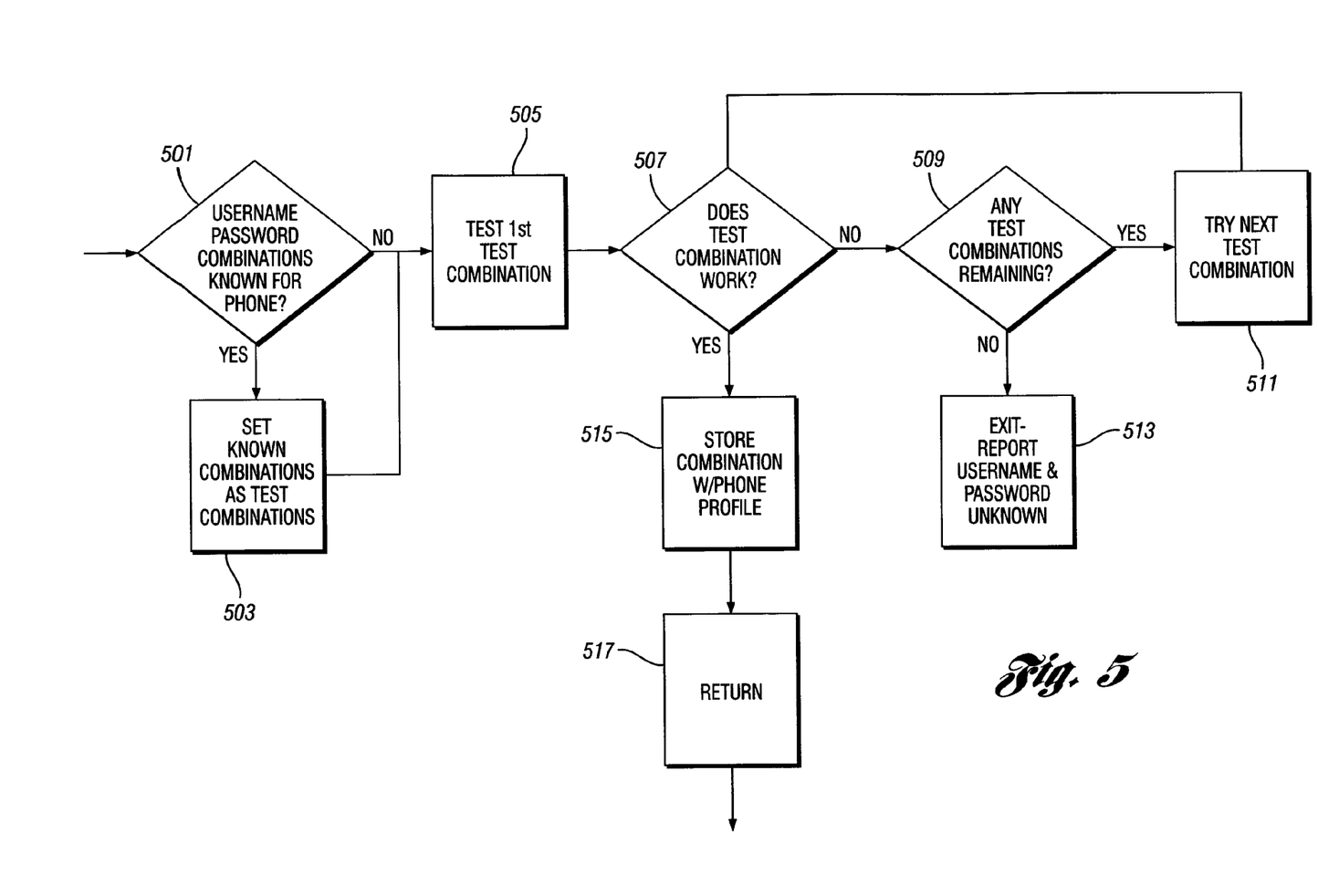
FIG. 5 shows an illustrative exemplary flow for determining a user name and password combination.

FIG. 5 shows an illustrative exemplary flow for determining a user name and password combination 219. Again, illustrative non-limiting examples have been previously presented 217, 325 that might give rise to occasion to call an exemplary process such as this.

Similar to the APN, it may be the case that there are a finite number or type of user name/password combinations used across all carriers. Also, as with the APNs, it may be the case that a carrier whose user name/password combination is known provides service for a device, but that the carrier is undeterminable for that device. Accordingly, a guess-andcheck methodology may be able to provide a user name and password workable with a particular device.

In this illustrative implementation, the system checks to see if user name password combinations are known for a device 501. As previously noted, certain carriers, such as AT&T/CINGULAR have several user names and passwords that might be usable, depending on how a phone is configured. If connecting to an AT&T or CINGULAR device, the username would be either wap@cingulargprs.com (for a wireless access point "WAP" connection) or isp@cingulargprs.com (for an internet service protocol "ISP" connection). The password in either case is "cingular1."

Thus, the system may have previously known that AT&T is the carrier and tried wap@cingulargprs.com and gotten a rejection, ending at the guess-and-check routine. Since, in this particular case, the system knows the carrier and it also knows that there are only two user names for that carrier, it can set those known combinations as the test combinations 503. This shortens the test list to expedite the process (although other test combinations can be tried if the shortened list is unsuccessful). This is just one example of how some known information can be used to refine the guess-and-check routines.

Whether using a shortened list or using a full list, the system proceeds to test a first user name/password combination 505. If the combination works 507, the combination can be stored with a phone profile (again, if available) 515 and the system can return to the process that called it. If the combination does not work 507, the system can check to see if there are any test combinations remaining 509.

If no combinations remain, the process can exit and return a message that the user name and/or password was unavailable. Again, the system could query a user to see if the APN is known, connect to the internet (through, for example, a voice over IP connection) and see if APNs are available that have not been tested, instruct the user to enter an appropriate APN at a later time online and send it to the system for an update, etc. In this case, it may be that a provider has decided to have users develop their own user names and/or passwords, and so it may be ideal to have the user input this information before the system can proceed.

If there are combinations that remain 509, the system tries the next remaining combination 511 and repeats this process until finding a combination that works or running out of possible combinations.

Electronic Mail

Figure 6:
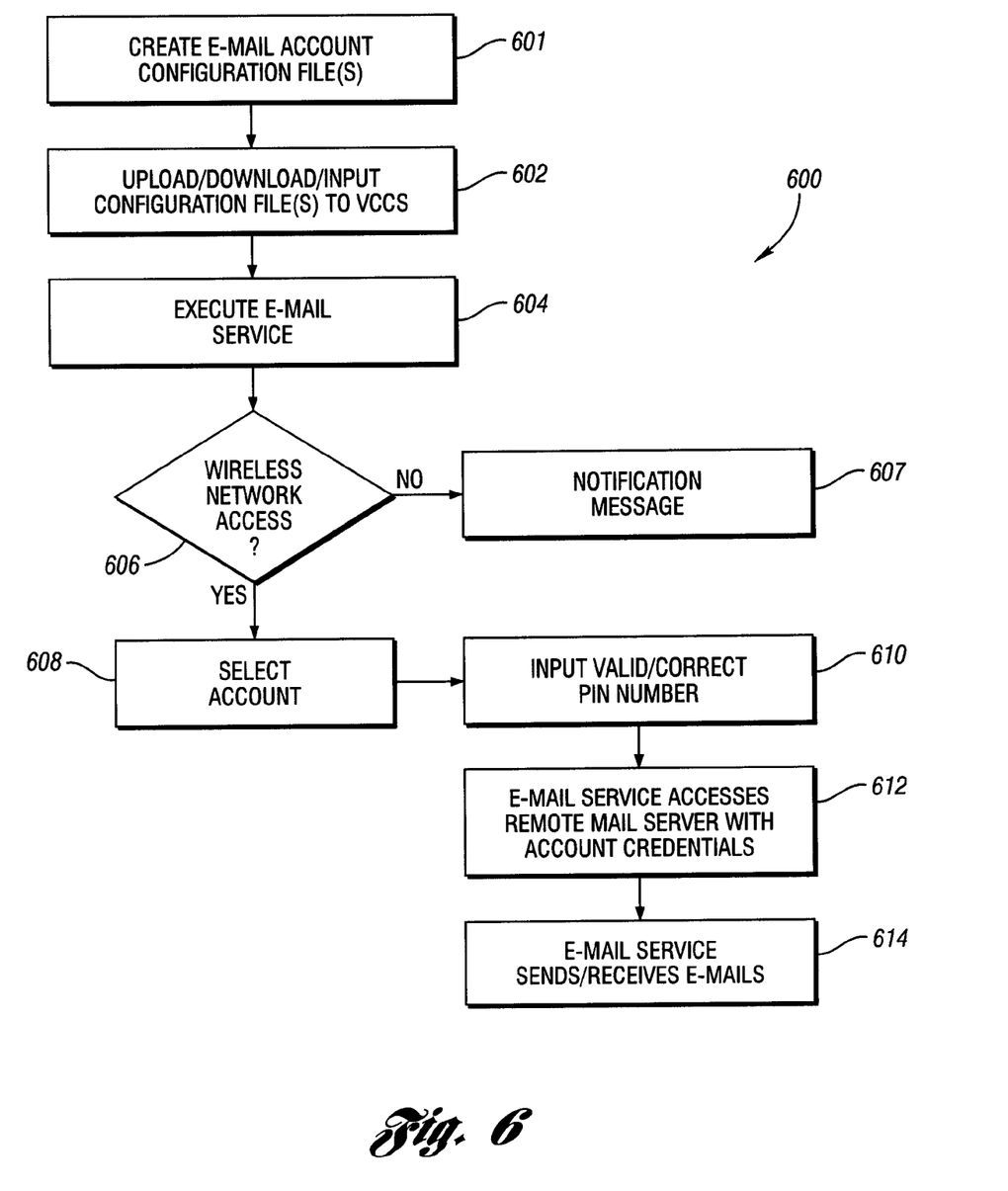
FIG. 6 shows an example methodology for provisioning electronic mail in a vehicle.

FIG. 6 illustrates an example methodology 600 for provisioning electronic mail in a vehicle. The particular implementation may vary within the scope of the present invention. Various alternative aspects and embodiments are described below. Aspects of FIG. 6 may me modified, supplemented or rearranged to best-fit a particular implementation of the present invention.

1. Configuring E-Mail Account(s)

One embodiment of the present invention may include configuring user e-mail account settings for provisioning in-vehicle e-mail functionality access, as represented in block 601. In this embodiment, it is assumed that a user of the e-mail service already possesses one or more e-mail accounts accessible over a computer or telecommunication network, such as the Internet.

Mail retrieval may be performed using services such as the Internet Message Access Protocol (IMAP), the Post Office Protocol (POP3), MS Exchange or others. Outgoing mail may be supported by the Simple Mail Transfer Protocol (SMTP). A user's account credentials for establishing e-mail access for these and other protocols typically include a user-name, a password, an incoming mail server IP address, and an outgoing mail server IP address (which may be the same as the incoming mail server IP address). Preferably, users also assign a name to each account. As described in greater detail below, multiple e-mail accounts may be distinguished by their respective names. Account data may also include one or more vehicle identification numbers (VINs) and a PIN number for security.

According to one embodiment of the present invention, the account data is organized in an XML file format, such as the following format:

```
<account>
  <name> Nellos.Yahoo </name>
  <user> Nello.Santorri </user>
  <password> password </password>
  <server> mail.server.net </server>
  <port> 110 </port>
  <pin> 1234 </pin>
</account>
```

Data for more than one account (each having different account name attributes) may be defined. The format of the account data is not limited to the above XML format. According to another embodiment, the account data is formatted in a text file. The account data files may be encrypted for additional security.

In one embodiment of the present invention, for vehicles in which the e-mail service is not already installed on the vehicle computing and communication system, the e-mail service software may be stored together with the e-mail account data for upload or download to the vehicle computing and communication system.

The user's account credentials and name may be input to the vehicle computing and communication system in a variety of different ways, represented generally by block 602. In one implementation, the account data may be saved on a flash drive and uploaded into the memory of the vehicle computing and communication system. In another implementation, the account data may be stored in the memory of a cellular telephone that is pared with the vehicle computing and communication system. After the cellular telephone is pared with the vehicle computing and communication system, the account data may be uploaded to the memory of the vehicle computing and communication system. In another embodiment, the account data may be stored in the memory of a remote computer or server accessible over the Internet. Upon establishing connectivity of the vehicle computing and communication system to the Internet, the account data could be downloaded to the memory of the vehicle computing and communication system. In yet another embodiment, the account data may be stored in the memory of a remote computer or server having local wireless connectivity to the vehicle computing and communication system. When the vehicle computing and communication system is within the proximity of the local wireless network the account data could be downloaded to the memory of the vehicle computing and communication system. In yet another embodiment, a user inputs the account data directly into the vehicle computing and communication system from within the passenger compartment of the vehicle, and no intermediate storage is necessary. For example, in an account setup mode, the user may input the account data by speaking it, or by operating data input buttons on the vehicle console.

In another embodiment of the present invention, users may access an Internet web site (e.g. www.syncmyride.com) to configure in-vehicle e-mail access. The users may be required to input a VIN number for a vehicle in which e-mail access is desired. A server-side test of the VIN number may confirm that the identified vehicle has the capabilities described herein to provide e-mail access. Through one or more data input screens, users may input their account name, credentials, PIN, etc. On the server side, the account data may be automatically formatted and organized into a downloadable file, such as the XML or text file described above. This may simplify the process of configuring the account data file for the user. After the account data file is assembled, a user may download the file from his or her computer to a flash drive, USB drive, cell phone, or other portable memory device, and then upload the account data file to the memory of the vehicle computing and communication system as described above. In another embodiment, the account data file may be downloaded from the server to the vehicle computing and communication system at a time during which the vehicle computing and communication system has access to the Internet.

2. E-Mail Begin

In one embodiment, e-mail provisioning the e-mail service may be started or resumed by selecting the service from a button or touchscreen on the radio head display or elsewhere in the passenger compartment, such as on the steering wheel or center console, as generally represented at block 604. Alternatively, the e-mail service may be activated by voice command, such as "Email." A button may be depressed in advance of the voice command to instruct the computing system that a voice request will follow for processing. If multiple e-mail accounts are configured, the user may also specify the name of the desired e-mail account at this time (or later, as described below).

Upon receiving the start/resume command, the e-mail service may execute a test to determine whether a communication device having connectivity to a telephone network or the Internet, such as a cellular telephone (hereafter "phone"), is connected in a wired or wireless (e.g. BLUETOOTH) fashion to the vehicle computing and communication system, as generally represented in block 606. If there is no connection, a connection attempt may be executed. If a connection cannot be established, a message is preferably displayed or read aloud informing the vehicle occupants that a network connection could not be established, as represented in block 607.

Upon establishing a connection with a phone, the e-mail service may search for an e-mail account configuration file. The service may search the memory of the vehicle computing and communication system to see if account credentials file(s) have already been stored for the specified account. If no credentials are located, the service may cause a query of any removable memory storage devices, such as a USB drive. If the file is located, it may be copied to the memory of the vehicle communication and computing system illustrated in FIG. 1. After the configuration file is copied to the system, this process may not need to be repeated unless changes to the account settings are made. Alternatively, the service may search for the file upon each startup in the event that users have made changes to their account settings and attached a memory device containing the updated configuration files for updating the system.

The e-mail configuration file may include configuration settings for more than one e-mail account. If the file contains information for more than one account, the service may prompt the user, either with a visual output on a display or audibly with a voice prompt, to select one of the accounts, as generally represented in block 608. A user may select an account by speaking or otherwise inputting the "friendly name" for the account, which is specified in the configuration file for that account. If only one account is configured or otherwise available, this step may not be necessary.

Once an e-mail account is selected, the service may execute a security provision, as generally represented in block 610. If a security PIN is specified for the account in the configuration file, the service may prompt the user to speak or otherwise input the PIN number for account access.

If the user passes the security provision, the service establishes an Internet connection with the paired communication device (e.g. cellular telephone).

Once the connection is established, the service connects to the e-mail server (e.g. POP3 server) identified in the account configuration file, and authenticates utilizing the account credentials associated with the account, as generally represented in block 612. Alternatively, the service may prompt the user at the time of access for his or her account credentials.

3. E-Mail Read

Once authenticated, the service may begin transmitting e-mail messages to and from the specified e-mail server(s), as generally represented in block 614. The service may obtain account information from the e-mail server regarding the status of the account. This information may include, but is not limited to, the number of total messages, the number of unread messages, and the number of new messages in the inbox for the account.

According to one embodiment, the account status may indicate which of several modes the service may automatically enter. For example, if the account has new messages, the service may enter the READ-NEW-MESSAGES mode. If the does not have new messages, but has unread messages, the service may enter the READ-UNREAD-MESSAGES mode. If the account does not have new or unread messages, the service may enter the READ-ALL-MESSAGES mode. In an alternative embodiment, the service may receive input from the user, spoken or otherwise, specifying the mode. For example, the user may speak or otherwise input "Read," "Read New," "Read Unread," or "Read All." The Read All input will cause the service to read entire messages. The information read back may include message meta data, such as FROM, DATE, and REGARDING information. The Read New input will cause the service to only read new messages, beginning with the first new message. The Read Unread input will cause the service to read unread messages, starting with the first unread message. After all messages are read, the service will instruct the user accordingly.

Preferably, the service is configured to receive navigational commands from the user such as "Next," "Previous," "Re-Read," Back," "Forward," "Next X," "Previous X," and the like. Preferably, these messages can be received while the service is reading a message or message meta data. A user may be required to depress a voice command button within the passenger compartment to inform the computing and communication system and/or the e-mail service that a voice command is forthcoming. Upon receipt of a Next command, the service may skip to the next message for the particular mode. Upon receipt of a Re-Read command, the service may start reading the current message over again. Upon receipt of a Previous command, the service may start reading the previous message. Upon receipt of a Back command, the service may read an earlier portion of the current message than the current portion being read. Upon receipt of a Forward command, the service may read a later portion of the current message than the current portion being read. Upon receipt of a "Next X" command, the service may read a later e-mail that is "X" number of e-mails after the current e-mail in the present mode. Upon receipt of a "Pext X" command, the service may read an earlier e-mail that is "X" number of e-mails before the current e-mail in the present mode.

Figure 7:
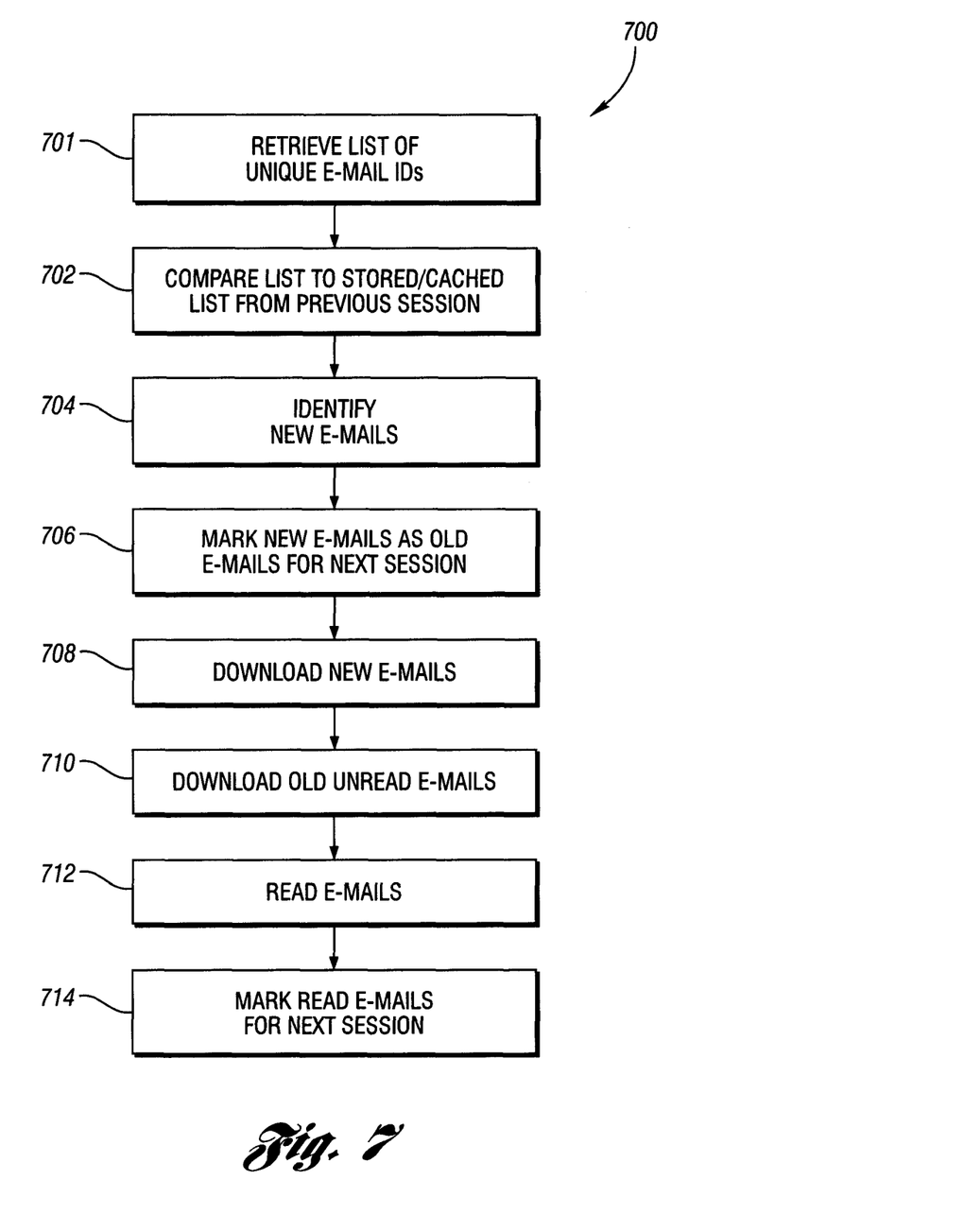
FIG. 7 shows an example methodology for downloading e-mails in accordance with one embodiment of the present invention.

For playback of e-mails from a POP3 server, the service may be configured to maintain in memory a rolling window of e-mail messages using a series of re-fetching and caching operations. FIG. 7 illustrates an example methodology 700 for downloading e-mails in accordance with one embodiment of the present invention. The particular implementation may vary within the scope of the present invention. Various alternative aspects and embodiments are described below. Aspects of FIG. 7 may me modified, supplemented or rearranged to best-fit a particular implementation of the present invention.

Upon accessing the POP3 server, the service may obtain a list of unique alphanumeric e-mail identifiers for each e-mail, as represented in block 701. The service may compare this list to a previous list already stored in the memory of the vehicle computing and communication system, as represented in block 702. This comparison may reveal which messages are "new," as represented in block 704. Preferably, the service also tracks the read-back of the old messages to know which of the old messages have already been read back to the user. Messages that are new for the current download session may be tagged as old and read or unread (as the case may be) for the next download session, as represented in block 708. This step need not occur between steps 706 and 710. For example, this step may occur in separate steps, or when the e-mails are read.

In one embodiment, the service will initiate a download of the new messages first as represented by block 708, followed by a download of old, unread messages as represented in block 710 before messages are read to the vehicle occupant(s) as represented in block 712.

In accordance with one embodiment, messages may be downloaded in a rolling window fashion. For example, if message 2 is being read, messages 1 and 3-5 may be downloaded in the event the user says "previous" or "next" and skips ahead or back. If the user skips to read message number 8, the window will shift to download messages 7 and 9-11. Of course, other window configurations may be implemented. In this manner, the typical user may be able to browser his/her e-mail without having to wait for additional messages to download. The rolling window may reduce the amount of communication bandwidth or local memory necessary to implement the e-mail service. The rolling window configuration may also reduce the number of POP3 logins necessary for an e-mail read session.

4. E-Mail Scan

Another service mode may include an e-mail scan mode. This mode may be entered automatically upon account access, or by user command (or other input) specifying "Scan," "Scan New," "Scan Unread," "Scan All," etc. According to one non-limiting embodiment, the scan command may cause the service to only read just the "From", "Subject", and "Date/Time" portions of messages. The particular portions of a message read back in a scan mode may be user specified as part of the configuration file, or as an input to the vehicle computing and communication system. "Scan New" may cause the service to scan only new messages, starting at the first new message. "Scan Unread" may cause the service to scan only new messages, starting at the first unread message. "Scan All" may cause the service to scan all messages, starting at the first message in the mailbox. Messages that are read or scanned during a scan session may be considered read. If there are no more messages of the specified type to scan (new, unread, all), the application may output a No-More-Messages message.

Preferably, the scan mode includes navigational controls similar to those disclosed above.

For retrievals of e-mails for scanning from a POP3 server, a "TOP X" command may be implemented. This function retrieves the e-mail header together with the first "X" lines of the e-mail. If X=0, only the header information is returned. If, upon playback, the user wishes to retrieve the remainder of the e-mail, the service may retrieve additional lines of the e-mail using the TOP command, or may retrieve the entire e-mail. If the TOP command is executed a second time, the service may subtract the original retrieval set (i.e. the lines already read back) from the additional lines retrieved for playback so the user does not listen to the same content twice, and only the additional lines are played back.

5. E-Mail Create

Another service mode may include a mode for creating outgoing e-mails. In this mode, a user may specify a name of one or more e-mail recipients. E-mail recipients may be specified by speaking or otherwise inputting a person's name. In this embodiment, the vehicle computing and communication system may scan the user's contact list, if available, for names matching the specified name. The contact list may be stored locally within the memory of the vehicle computing and communication system, or accessed wirelessly from the user's cellular telephone using a BLUETOOTH connection. Once a match is located, the e-mail address of the identified person, if available, is copied for addressing the e-mail. This process may be repeated for additional recipients of the e-mail.

If no address book or e-mail address is available for lookup, the user may speak the letters of the recipient's e-mail address, or otherwise input the address through the vehicle console interface. If the e-mail address is spoken, it is preferably read back by the vehicle computing and communication system to confirm accuracy.

Next, the user may specify a subject for the e-mail. The user may speak the subject, or otherwise input the subject through the vehicle console interface. If the subject is spoken, it is preferably read back by the vehicle computing and communication system to confirm accuracy.

Next, the user may specify the content of the e-mail. This may be performed in a number of different ways, which may be combined. For example, the user may speak the content of the e-mail. In one embodiment, the spoken language may be converted at the vehicle computing and communication system from speech to text, and then embedded as text into the body of the e-mail. In another embodiment, the spoken language may be uploaded to a remote server for converting the language from speech to text. The remote server may return the text file to the vehicle for embedding in the e-mail, or the server may send the e-mail directly. In a third embodiment, the spoken voice may be stored as an audio file. The audio file may be appended to the e-mail as a file attachment for playback by the recipient. In yet another embodiment, the content of the e-mail may be manually input using the vehicle console interface, or other input device such as a keyboard.

In vehicles equipped with a global positioning system (on-board or as peripheral, e.g. within a paired cellular telephone), the vehicle's current location could also be appended to the body of the e-mail. This feature could be implemented at the user's request, or automatically in an emergency situation such as a car accident.

According to one embodiment of the present invention, a safety feature may be implemented in which the vehicle console or steering wheel is not available for user input to operate some or all aspects of the e-mail service while the vehicle is in one or more states of operation. For example, the user may not be permitted to manually input information unless the vehicle is in park. In another example, the user may not be permitted to manually input information unless the vehicle is stopped. In a third example, manual input will only be permitted while driving if a person is sitting in the passenger seat. In yet another example, only a set of controls within the reach of the passenger (or back seat) may be operational while the vehicle is in gear or motion. Other input lock-out scenarios may be implemented.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed:

1. A computer implemented method comprising:
retrieving user-email login credentials;
connecting to one or more user email accounts utilizing the retrieved credentials, wherein the connection is established through a wireless device in wireless communication with a vehicle computing system (VCS) and a remote network;
determining if one or more new emails are present in any of the one or more email accounts;
contingent on the presence of one or more new emails, downloading a header portion of a new email and some predetermined portion of the new email less than the entire content of the new email, vocally specified by a user as part of an email download request; and
contingent on the downloading of a header portion of a new email and some predetermined portion of the new email less than the entire content of the new email, outputting at least the downloaded header portion of the new email through a vehicle audio system.

2. The method of claim 1, wherein the outputting further includes outputting at least the predetermined portion of the new email.

3. The method of claim 1, further including:
receiving a command to retrieve a remaining un-downloaded portion of the new email;
responsive to receiving the command, downloading a remaining un-downloaded portion of the new email; and
outputting the remaining un-downloaded portion of the new email through the vehicle audio system.

4. The method of claim 1, wherein the determining if new emails are present includes comparing identifiers associated with one or more emails to identifiers associated with previously downloaded emails, wherein the absence of a corresponding identifier indicates a new email.

5. The method of claim 4, wherein the identifiers are alphanumeric identifiers.

6. A non-transitory computer readable storage medium storing instructions that, when executed by a processor, cause the processor to perform the method comprising:
retrieving user-email login credentials;
connecting to one or more user email accounts utilizing the retrieved credentials, wherein the connection is established through a wireless device in wireless communication with a vehicle computing system (VCS) and a remote network;
determining if one or more new emails are present in any of the one or more email accounts;
contingent on the presence of one or more new emails, downloading a header portion of a new email and some predetermined portion of the new email less than the entire content of the new email, vocally specified by a user as part of an email download request; and
contingent on the downloading of a header portion of a new email and some predetermined portion of the new email less than the entire content of the new email, outputting at least the downloaded header portion of the new email through a vehicle audio system.

7. The computer readable storage medium of claim 6, wherein the outputting further includes outputting at least the predetermined portion of the new email.

8. The computer readable storage medium of claim 6, wherein the method further includes:
receiving a command to retrieve a remaining un-downloaded portion of the new email;
responsive to receiving the command, downloading a remaining un-downloaded portion of the new email; and
outputting the remaining un-downloaded portion of the new email through the vehicle audio system.

* * * * *